No. 775,458. Patented November 22, 1904.

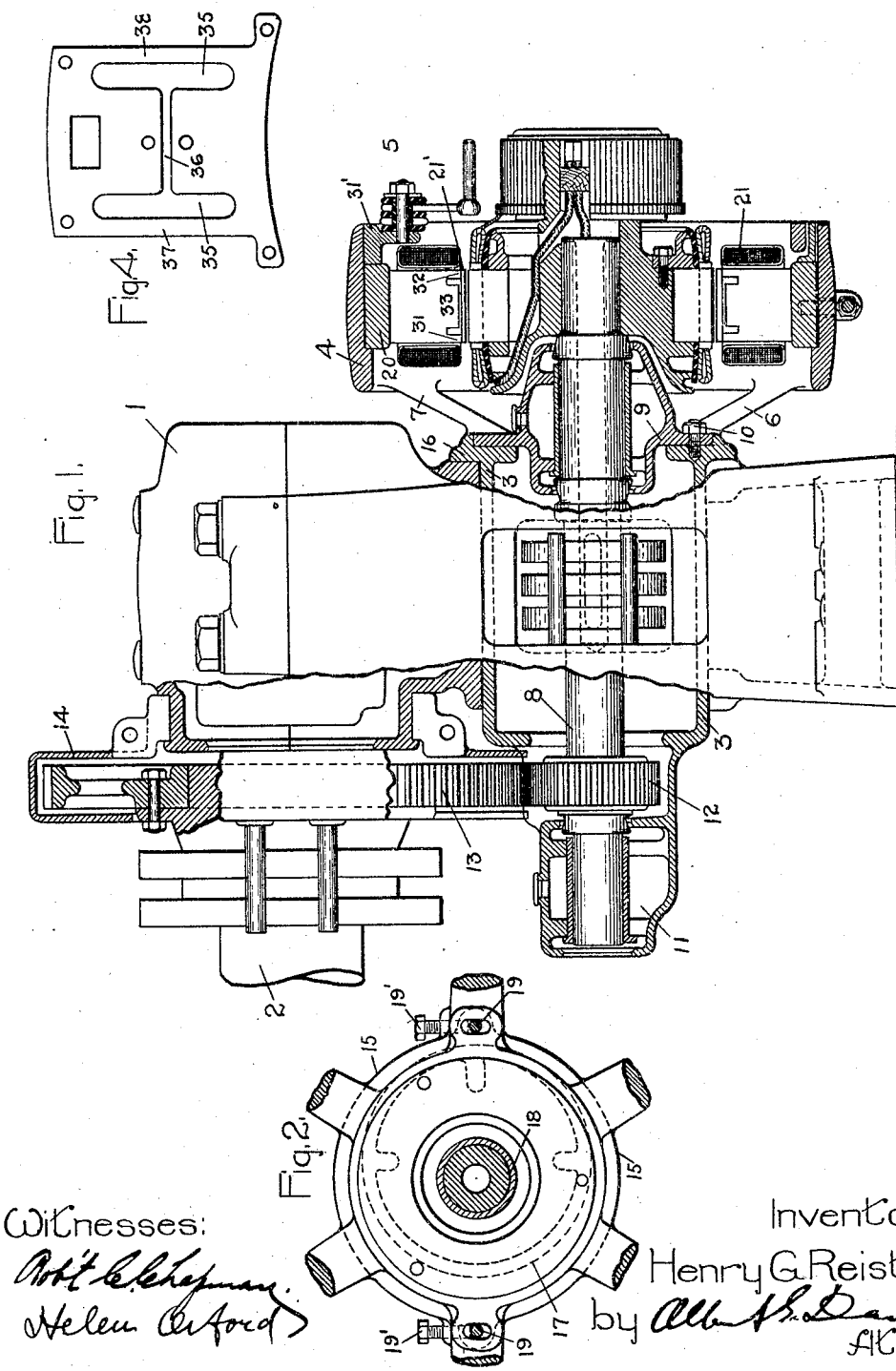

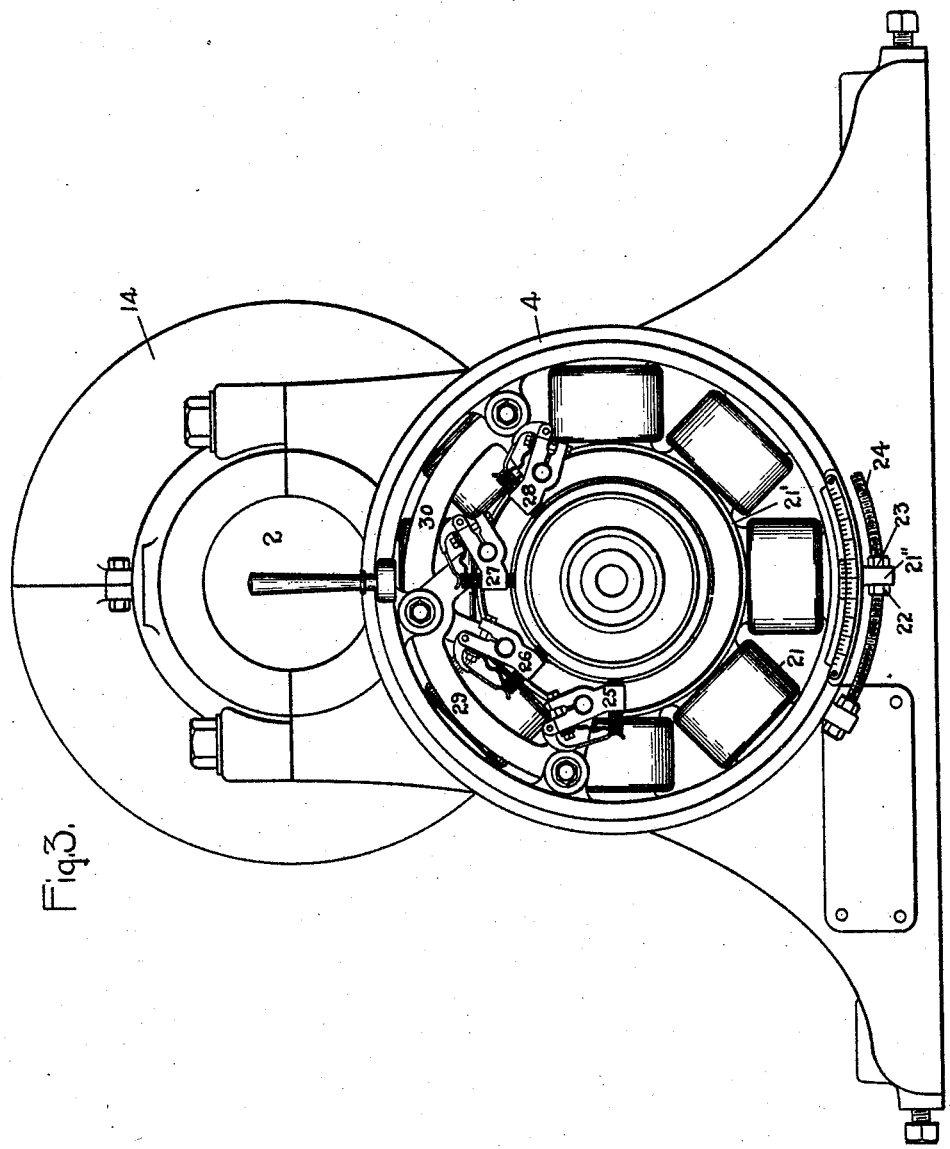

UNITED STATES PATENT OFFICE.

HENRY G. REIST, OF SCHENECTADY, NEW YORK, ASSIGNOR TO GENERAL ELECTRIC COMPANY, A CORPORATION OF NEW YORK.

DYNAMO-ELECTRIC MACHINERY.

SPECIFICATION forming part of Letters Patent No. 775,458, dated November 22, 1904.

Application filed May 9, 1902. Serial No. 106,573. (No model.)

*To all whom it may concern:*

Be it known that I, HENRY G. REIST, a citizen of the United States, residing at Schenectady, county of Schenectady, State of New York, have invented certain new and useful Improvements in Dynamo-Electric Machinery, of which the following is a specification.

My present invention relates to certain improvements in the construction and mounting of dynamo-electric machines, the novel features of which are particularly pointed out in the appended claims.

The invention is capable of various applications, but is hereinafter set forth, for purposes of illustration, in connection with an exciter for a dynamo-electric machine of that type now commonly known in the art as a "compensated alternator," wherein current from the alternator is conveyed either directly or inductively to the exciter-armature, which current thus conveyed operates to vary the armature reaction of the exciter in such manner as to compensate for variations of the load and power factor of the main generator or alternator.

In the drawings I have not considered it necessary to illustrate the main alternator, but have shown merely one of its main bearings or pillow-blocks, in connection with which the exciter for the alternator is mounted.

Figure 1 is a view, partly in section, of an exciter arranged in accordance with my invention on one of the pillow-blocks of the main alternator, not shown. Fig. 2 is a detail, and Fig. 3 is an end view, of so much of the machine as is represented in Fig. 1. Fig. 4 is an elevation of a pole-piece laminæ.

In Fig. 1 the pillow-block of the main alternator is represented at 1 and the main shaft carried by the pillow-block at 2, this shaft being represented in end view at 2 in Fig. 3. The pillow-block is formed with a circular opening directly below the main bearing, and in this opening is mounted a hollow cylinder or sleeve 3, which is cast integral with but eccentric to the ring-shaped supporting frame or yoke 4 of the exciter, (represented generally at 5.) Radial arms, such as 6 and 7, serve to connect the sleeve 3 with the ring-like member 4 and, as has been before mentioned, are cast integral with the sleeve and the ring-like member. The shaft of the exciter is represented at 8 and is carried in bearings mounted in the respective ends of the cylindrical member 3. The main bearing is represented at 9 and is separable from the sleeve 3 and is held in position by bolts or other securing means, one of which bolts is represented at 10. The support for the other or outer bearing of the shaft 8 is formed integral with the sleeve 3 and is represented at 11. The exciter-shaft carries a pinion 12, which meshes with a driving-gear 13, mounted on the main shaft 2 of the main machine. The pinion is inclosed within the casing supporting the exciter-shaft, while the driving-gear 13 is similarly inclosed by means of a gear-casing 14.

To enable the driving-gear and its pinion to be adjusted relatively to each other, the cylinder 3 is cast so that its axis is displaced laterally from the axis of the shaft 8, which latter axis of course is central with respect to the ring-shaped field-magnet support or yoke 4. This is represented perhaps best in Fig. 2, in which a bounding-line 15 represents the circumference of the flange 16 formed on the cylinder 3. The dotted circle 17, displaced eccentrically with respect to the circumference 15, represents the outer surface of the cylinder 3, while the small circle 18, concentric with the circumference 15, indicates the shaft 8, which, as will be seen, is of course eccentric with respect to the axis of the cylinder 3. If this cylinder be rotated slightly in its bearings, it is obvious that the shaft 8 will rise or fall in space, as the case may be, thereby permitting the pinion 12, carried by the shaft, to be adjusted to or from the driving-gear 13 by the adjusting-screws 19', as may be required. After suitable adjustment is secured the movable structure, including the sleeve 3 and parts carried thereby, is clamped in place by means of set-screws 19.

The ring-shaped member 4 forms the mechanical support for the field-magnet structure proper of the exciter, this structure consisting of a ring 20, provided with a number of pole-pieces upon which are mounted the usual field-coils, as indicated at 21 in Fig. 3. The pole-faces of the pole-piece are joined by a ring of magnetic material 21' in order to secure a somewhat more uniform transition of flux about the surface of the exciter-armature. The ring or yoke 20, carrying the pole-pieces, is adjusted within its supporting member 4 so as to enable the pole-pieces to be adjusted around the exciter-armature, for purposes well understood in connection with this class of machine. To secure this adjustment conveniently, a lug 21'', connected to the yoke 20, extends downward and is arranged to engage adjusting-nuts 22 23 on a screw-threaded rod 24, secured at one end to the supporting-frame 4. By suitably adjusting these nuts in an obvious manner the field structure of the exciter may be adjusted about the exciter-armature.

The brush-holders 25 to 28 are arranged so that those of like polarity are supported from a brush-holder yoke formed of a somewhat bow-shaped piece of metal, such as at 29 or 30. Each brush-holder yoke is mechanically secured to but insulated from a ring 31', movable within the field-frame 4, and serves the double function of a mechanical support for and electrical connection between brush-holders of like polarity.

The important feature of my invention consists in a means for securing stable operation of dynamo-electric machines—such, for example, as the exciter above described. The exciter referred to is required by reason of its relations to the main alternator to vary in voltage and field strength through very wide limits. In the ordinary construction of exciter the design is generally such as to make the machine work upon that portion of the saturation curve above or near the knee or bend where the iron commences to saturate. Within and above this range the field flux does not respond proportionally to variation of voltage at the terminals of the field-winding. By reason of this fact variations of voltage generated in the armature are not exaggerated by resultant variations of strength of field, thereby insuring a stability of operation as contrasted with wide and erratic fluctuations of voltage, such as would occur if the machine were worked upon a portion of its magnetic characteristic below the bend. In accordance with my invention the characteristic curve of the machine is shaped so as to secure stability of operation throughout a range varying from comparatively low field strength up to magnetization approaching saturation. To secure this stable operation over the low field densities, I shape the magnetic circuit or circuits of the machine so that a portion of the same commences to saturate with low values of total flux, and with rising values of flux lines of force are shunted across a small air-gap in the magnetic circuit, thereby producing a further drooping of the magnetic characteristic.

Heretofore it has been proposed to utilize a constricted neck in the magnetic circuit in connection with an air-gap, the neck being of substantially the same length as the air-gap. Under these circumstances the reluctance of the neck formed such a small portion of the reluctance of the entire magnetic circuit that no appreciable effect was produced upon the saturation curve until the neck reached saturation. By lengthening the neck, however, the saturation curve begins to bend almost as soon as it leaves the origin, and when this neck or restricted path for the magnetic flux becomes saturated the air-gap is then brought into operation. The result is a saturation curve permitting a wide range of stable operation for the exciter.

In Fig. 1 is shown one mode of arranging the magnetic circuit to produce the result specified, while Fig. 4 represents a different arrangement for producing the same general results. In Fig. 1 each field-pole is slotted, so as to form two constricted necks 31 and 32, and these constricted portions project slightly beyond the level of the portion 33 of the pole lying between the slots. The cylindrical band of soft iron indicated at 21' and shown in side elevation in Fig. 3 connects together the projecting portions of all of the poles, whereby a more gradual transition of flux about the surface of the armature is obtained. Inasmuch, however, as the central portion 33 of each pole does not extend quite out to a line joining the surfaces of the constricted portions or necks 31 32, it will be seen that a slot is formed between the portion 33 and the cylindrical ring 21'. The arrangement shown in Fig. 4 is similar in principle though differing slightly in construction. In this case the field-pole is provided with an opening 35, having a cross-section similar to the letter H. The cross-bar 36 of the H represents the slot in the magnetic circuit corresponding to the slot between the portions 33 and 21' in Fig. 1. The thin connecting portions 37 and 38 of the pole-piece in Fig. 4 are of sufficient length, so that their reluctance may have an appreciable effect upon the reluctance of the entire magnetic circuit. Inasmuch as these begin to saturate at comparatively low values of the total flux in the magnetic circuit, they have the effect of causing the saturation curve of the magnetic circuit to bend or droop at a lower flux value than would be the case if the length of these portions were equal only to the length of the cut or slots 36 in the magnetic circuit. As set forth above, somewhat more in detail, the resulting effect is an extension of the range of stability of operation of the machine, and this, as has been mentioned, is in many cases an extremely-valuable feature.

Certain features of the construction shown and described, but not claimed in this case, are claimed in my copending application Serial No. 157,556, which was filed May 18, 1903, as a division of this application.

What I claim as new, and desire to secure by Letters Patent of the United States, is—

1. In a dynamo-electric machine, a magnetic circuit having a portion thereof of constricted cross-section, and a slot in the magnetic circuit having a width in the direction of the magnetic flux less than the length of said portion of the magnetic circuit of constricted cross-section.

2. In a dynamo-electric machine, a field magnetic circuit, provided at one or more portions thereof with two paths for the magnetic flux, one of said paths including a slot in the material forming the magnetic circuit and the other a reduced cross-section of said magnetic material of a length greater than the width of said slot.

In witness whereof I have hereunto set my hand this 7th day of May, 1902.

HENRY G. REIST.

Witnesses:
BENJAMIN B. HULL,
HELEN ORFORD.